(No Model.)
J. HARBISON.
BROADCASTING SEED DRILL.
No. 362,157. Patented May 3, 1887.
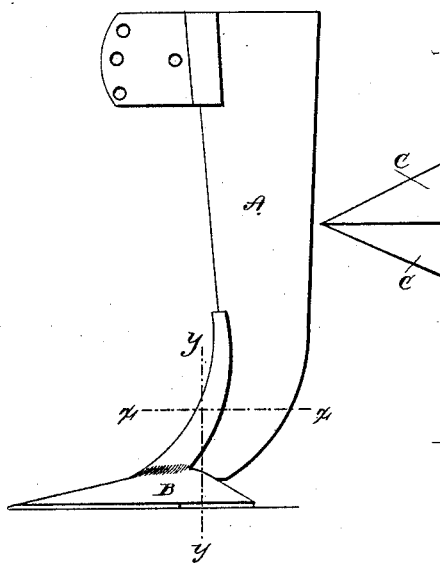
Fig. 1.
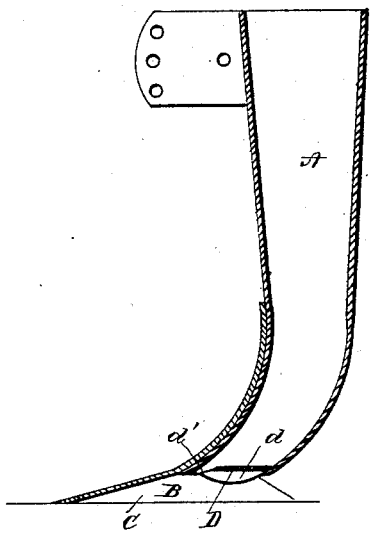
Fig. 3.
Fig. 2.
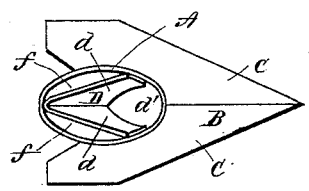
Fig. 4.
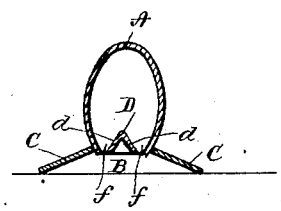
Fig. 5.
Witnesses
James M. Gibson
J. W. Garner
Inventor
Joseph Harbison
By his Attorneys
C. A. Snow & Co.

United States Patent Office.

JOSEPH HARBISON, OF BAVARIA, KANSAS.

BROADCASTING SEED-DRILL.

SPECIFICATION forming part of Letters Patent No. 362,157, dated May 3, 1887.

Application filed May 10, 1886. Serial No. 201,769. (No model.)

*To all whom it may concern:*

Be it known that I, JOSEPH HARBISON, a citizen of the United States, residing at Bavaria, in the county of Saline and State of Kansas, have invented new and useful Improvements in Broadcasting Seed-Drills, of which the following is a specification.

My invention relates to an improvement in broadcasting seed-drills; and it consists in the peculiar construction and combination of devices, that will be more fully set forth hereinafter, and particularly pointed out in the claim.

In the drawings, Figure 1 is a side elevation of a seed-drill embodying my improvements. Fig. 2 is a vertical sectional view of the same. Fig. 3 is a horizontal section taken on the line $x\ x$ of Fig. 1. Fig. 4 is an inverted plan view. Fig. 5 is a transverse sectional view taken on the line $y\ y$ of Fig. 1.

The object of my invention is to provide a seed-drill for sowing the seeds broadcast and spreading them apart in the bottom of the furrow.

A represents the seed tube or spout of the usual grain-drill, which seed tube or spout may be of any preferred construction, and is provided at its lower end with a hoe or furrow-opener, B. This hoe or furrow-opener is made of a piece of sheet metal or plate which is bent in the center longitudinally, so as to form the sloping laterally-extending sides C, which are sharpened or cut away on their front sides to the point at the center, as shown. By this construction it will be understood that the center of the hoe, between the sloping sides thereof, is raised above the outer edges of the said sides for a slight distance, and that the hoe is adapted to open a broad shallow trench or furrow as the machine moves forward.

In the lower end of the seed-tube is placed a seed-scatterer, D, which is made of a sheet of metal, and is bent in its center to form the inclined sides $d$. At the front end of the seed-scatterer is an opeing, $d'$, which is immediately in rear of the center of the hoe. This seed-scatterer is not sufficiently wide to entirely close the opening at the lower end of the seed-tube, but only to partly close the same, and as the seed-scatterer extends centrally across the lower end of the seed-tube, openings $f$ are left between the sides of the seed-scatterer and the sides of the seed-tube, as shown. Through these openings, and through the opening $d'$, the seeds pass as they are fed down through the seed-tube.

The operation of my invention will be very readily understood. As the machine advances the hoe opens a broad shallow furrow, and the seeds as they fall through the seed-tube strike upon the inclined sides of the seed-scatterer, and are deflected thereby outwardly under the inclined sides of the hoe, and are thus scattered evenly over the bottom of the furrow. It will be observed that the structure of the hoe is such as to only slightly raise the earth in advance of the lower end of the seed-tube, so as to allow the latter to pass, and that as soon as the seed-tube passes a given point the earth which was raised by the inclined sides of the hoe falls back into the furrow, thereby covering the seeds. This insures planting the seeds at a uniform depth in the ground, and provides means for effectually covering them, and places the seeds in the moist earth, where they will speedily germinate.

It will be observed that the seed-scatterer D is triangular in outline and also in cross section. The scatterer is secured at the several angles at different points around the mouth or outlet end of the seed tube or spout. This arrangement enables the scatterer to be applied to any form of seed tube or spout without cutting away or changing the tube. The construction of the scatterer or deflector D with the sharp top and inclined sides is proof against seed accumulating on top of the scatterer and causing the choking of the seed-tube. The arrangement of the openings $d'\ f\ f$ for the escape of seed enables an even but not too great a distribution of the seed.

Having thus described my invention, I claim—

In a seed-drill, the scatterer or deflector D, triangular in outline and bent centrally to form the inclined sides $d$, the said scatterer being secured at the several angles at different points around the outlet end of the seed-drill spout or tube, so as to leave the three openings $f\,f\,d'$, the said scatterer being triangular in cross-section, so as to provide a pointed top which will obviate the accumulation of seed on the scatterer and the consequent choking of the seed-tube, as set forth.

In testimony that I claim the foregoing as my own I have hereto affixed my signature in presence of two witnesses.

JOSEPH HARBISON.

Witnesses:
D. S. JONES,
JAMES ALGER.